MAGNETIC AMPLIFIER CONTROL CIRCUIT

Filed Aug. 6, 1963 4 Sheets-Sheet 1

INVENTORS
ISADORE K. DORTORT
FRANCIS R. BINGHAM
BY
OSTROLENK, FABER, GERB & SOFFEN
ATTORNEYS

MAGNETIC AMPLIFIER CONTROL CIRCUIT

Filed Aug. 6, 1963 4 Sheets-Sheet 2

INVENTORS
ISADORE K. DORTORT
FRANCIS R. BINGHAM
BY
OSTROLENK, FABER, GERB & SOFFEN
ATTORNEYS

MAGNETIC AMPLIFIER CONTROL CIRCUIT

Filed Aug. 6, 1963 4 Sheets-Sheet 3

INVENTORS
ISADORE K. DORTOR
FRANCIS R. BINGHA
BY
OSTROLENK, FABER, GERB & SOFFE
ATTORNEYS

INVENTORS
ISADORE K. DORTORT
FRANCIS R. BINGHAM
BY
OSTROLENK, FABER, GERB & SOFFEN
ATTORNEYS 3,302,122

MAGNETIC AMPLIFIER CONTROL CIRCUIT

Isadore K. Dortort, Philadelphia, and Francis R. Bingham, Norristown, Pa., assignors to I-T-E Circuit Breaker Company, Philadelphia, Pa., a corporation of Pennsylvania Filed Aug. 6, 1963, Ser. No. 300,201
6 Claims. (Cl. 330—8)

This invention relates to magnetic amplifiers and more specifically relates to a novel control arrangement for magnetic amplifiers and particularly multiphase single-way magnetic amplifiers.

High current, low voltage rectifiers are often provided with self-saturating reactors for control of their output. Such rectifiers, for example, may have D.-C. current outputs of the order of 25,000 amperes at D.-C. voltage outputs of the order of 50 volts which may be regulated down to the order of a few percent of rated output voltage. The control reactors are connected in series with suitable banks of diodes. The entire apparatus comprises, in fact, a giant magnetic amplifier.

Output control is then achieved by each reactor by causing the state of magnetization of the reactor to require more or less flux increase to forward saturation before forward power current conduction can occur through their respective diodes or diode banks.

This controlled state of magnetization for the diodes is commonly adjusted by means of a D.-C. bias circuit for the reactor which tends to drive the reactor flux in a direction opposite to the direction in which forward current of the diodes drives the reactor flux. This bias can be adjusted to intersect the magnetizing curve of the reactor at an adjustable point so that, when the forward current of the diodes is reduced toward zero, a flux reduction or reversal occurs in the reactor, hereinafter called reversal, and ceases at a point, when diode current is zero, determined by the ampere turns supplied by the bias. Before the diode can conduct forward current, during the next cycle the amount of flux so reversed must first be overcome, thereby causing D.-C. voltage regulation. The amount of voltage regulation clearly will depend on the ampere turns supplied by the bias, this value being suitably adjustable.

This mode of control is suitable for operation where diodes and their respective series connected reactors are not required to operate in parallel with other diodes and their respective series connected reactors, and the ampere turns due to diode reverse current is negligible with respect to the bias ampere turns. Thus, in a bridge connected amplifier, the load current flows simultaneously through one arm on each side of the bridge, but these arms are effectively connected in series so that no unbalance of current between them can occur, even though the voltage drops across the two saturable reactors may be different because of known and unknown differences in their control characteristics. Similarly, in the single-way single-phase full-wave circuit each of the two reactors carries one-half the average direct current output so that they are considered to be in parallel, but except during a short period of overlap which occurs in some modes of operation, each reactor carries the full load current for a period of 180° or less, the two conducting periods occurring consecutively, being out of phase 180°. Therefore, they do not actually operate in parallel.

In high power applications, however, it is desirable to use single-way multiphase circuits such as the double Y with interphase transformer which require one-half as many rectifying devices as double-way circuits for the same direct current output, within the permissible limits of reverse voltage.

In such devices, where there is always conduction of parallel arranged diode and reactor circuits, it was found that these rectifiers exhibited not only severe unbalance, but also instability, to the extent that the load current was transferred almost completely to one side or the other of the double-Y circuit.

Other than the unbalance caused by unequal impedance in the two sides of a double-Y rectifier, due mostly to geometric differences, a further cause of unbalance is the difference in residual magnetism of the reactors and the shape, slope and rise of the saturation curve out to maximum M.M.F. which may exceed 400 ampere turns per inch. Careful control of dimensions, weights and annealing, together with pretesting and matching can keep the differences to a minimum. In practice, it has not been found possible to do an entirely adequate job with oriented silicon steels. Moreover, the superior characteristics of 50–50 nickel-iron steels cannot be utilized in large equipments because of their prohibitive cost.

Another serious but well known problem occurs in the unsaturated portion of the hysteresis loop. Variations in this area are very critical since they affect the control characteristics. Moreover, variations occur here as a function of the speed of magnetization which causes a change in the width of the hysteresis loop and therefore changes the response to control signal or bias.

Another irregularity or, at least, a change in the theoretical control characteristic is the reverse leakage current of the rectifying element. This was recognized early in the art of magnetic amplifiers when special selenium rectifiers were developed for use in standard circuits. With the advent of silicon diodes, this effect has been more or less disregarded, especially in heavy current applications. However, it can be shown now that the effect of leakage current of silicon diodes is not negligible in multiphase single-way amplifiers. In multiphase bridge connected amplifiers, the leakage current modifies the control characteristic but cannot cause current unbalance between the two sides. In single-phase single-way circuits, the unbalance is moderate. In single-way multiphase amplifiers, the effect is more serious because current unbalance is produced, which in combination with other factors, can cause cumulative action and result in instability.

The principle of the present invention is to force a controlled amount of flux reversal of the saturable reactors after current zero of their respective diodes by a circuit which provides a controlled number of volt-seconds to the reactor to reverse the flux in a direction opposite to that in which it is driven by the forward current of its respective diode. That is to say, instead of relying upon the ampere turns of a D.-C. bias which permits the main circuit to supply a certain number of volt-seconds to reverse the reactor flux, an auxiliary source of volt-seconds is provided. Therefore, reliance upon a match of the D.-C. bias to a highly variable magnetizing curve, which differs in control characteristics for each phase, is eliminated and accurate control for parallel operation is provided.

This type of novel control is to be specifically distinguished from flux reversal circuits of the type used in mechanical rectifiers as shown in U.S. Patent 2,817,805 to Diebold, assigned to the assignee of the present invention, and which we now choose more properly to call "flux reset circuits." In this type device, the rectifying element is a mechanical contact, and thus a perfect valve. After the conduction period is ended, the respective reactors purposely had their flux fully reversed by the commutating voltage through the use of a suitable biasing circuit. Thereafter, the flux was reset by an auxiliary source of volt-seconds in the same direction in which it would be driven by the normal contact current to a point which leaves flux still to be reset when the contact recloses to provide a regulating "make step" for the contact. That is to say, the mechanical rectifier type of auxiliary source of volt-seconds causes flux reset in a direction opposite to that of the auxiliary source, and acted only after the flux of the reactor was completely reversed.

Accordingly, a primary object of this invention is to provide a novel mode of control for magnetic amplifiers.

Another object of this invention is to provide a novel control circuit for magnetic amplifiers which have parallel operating circuits.

A further object of this invention is to permit the stable operation of six-phase double-Y connected rectifiers.

These and other objects of the invention will become apparent from the following description when taken in connection with the drawings in which.

Figure 1:
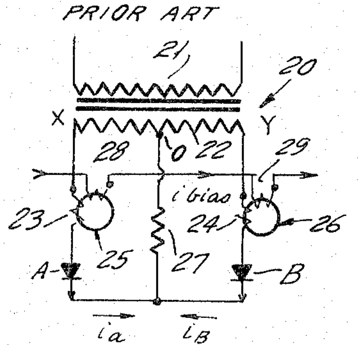
FIG. 1. PRIOR ART
FIGURE 1 shows a single-way, full wave amplifier with prior art type D.-C. bias current control.

FIGURES 3*a*, 3*b*, 3*c* and 3*d* show voltage distribution, reactor and diode current, reactor and diode voltage respectively for the circuit of FIGURE 1 when plotted against a common time base.

Figure 4:
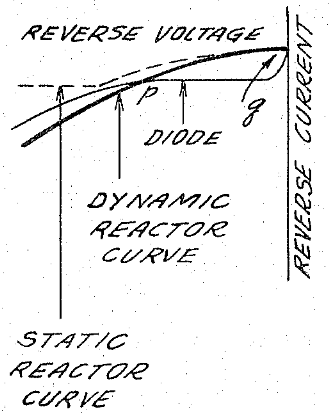

FIGURE 4 compares the leakage current of one of the diodes and the magnetizing current of its reactor of FIGURE 1 as a function of reverse voltage.

Figure 5:
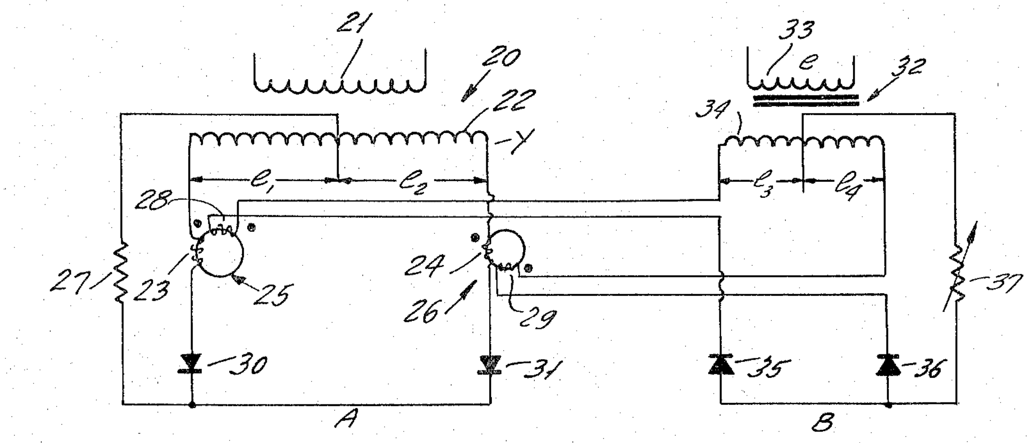

FIGURE 5 shows a first embodiment of the invention for a single-way full wave amplifier of the type shown in FIGURE 1.

Figure 6:
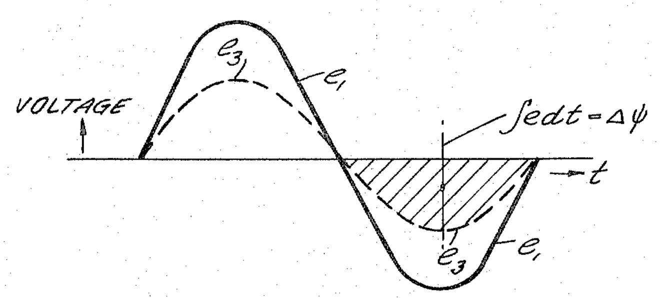

FIGURE 6 shows the flux reversal voltages applied to the system of FIGURE 5.

Figure 7:
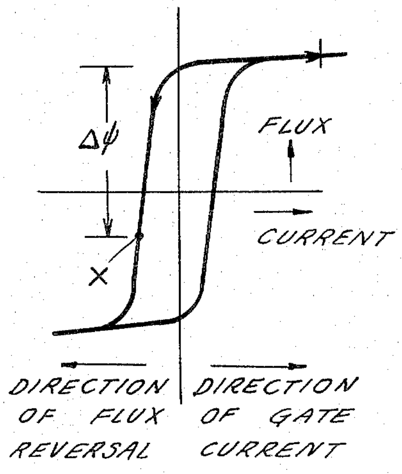

FIGURE 7 shows the hysteresis loop of one of the cores of FIGURE 5.

Figure 8:
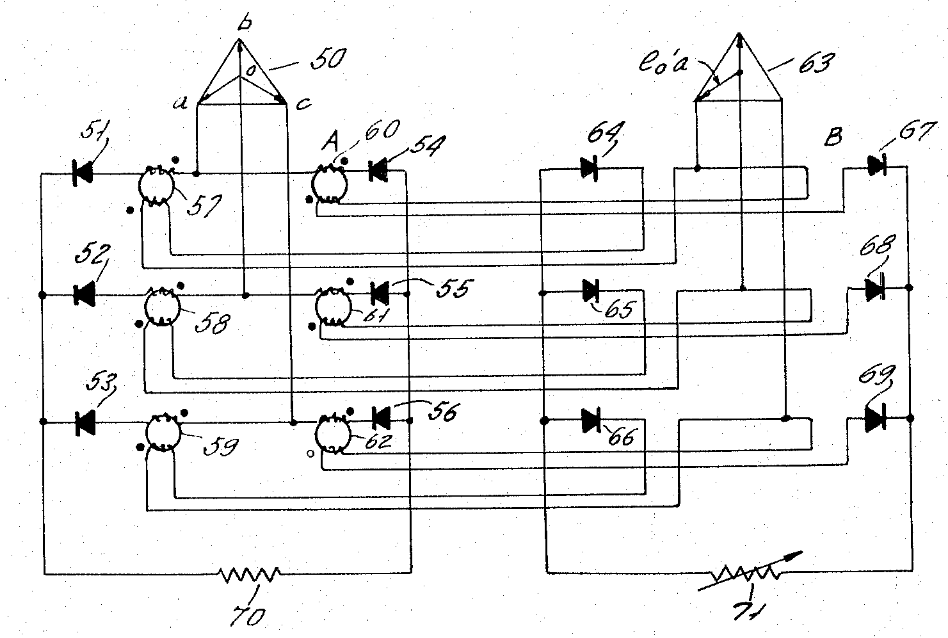

FIGURE 8 illustrates the novel invention as applied to a multiphase magnetic amplifier.

Figure 9:
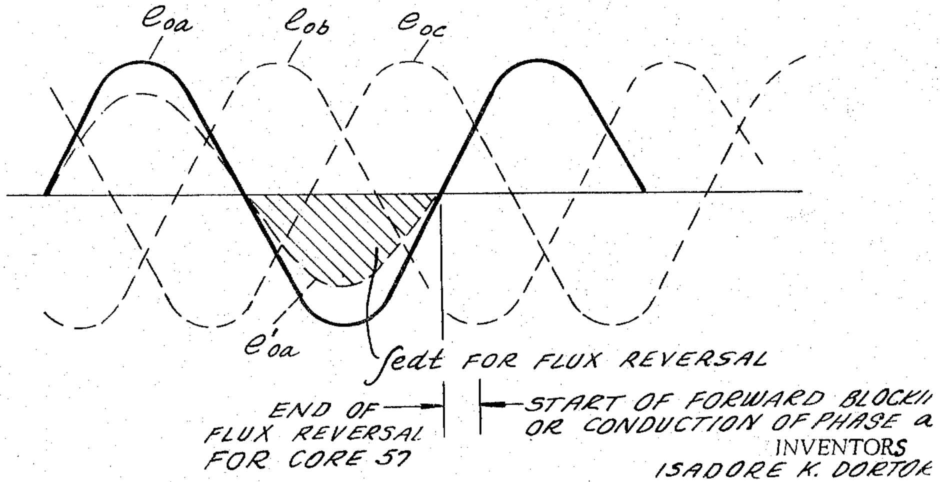

FIGURE 9 illustrates the voltages appearing in the circuit of FIGURE 8.

Figure 10:
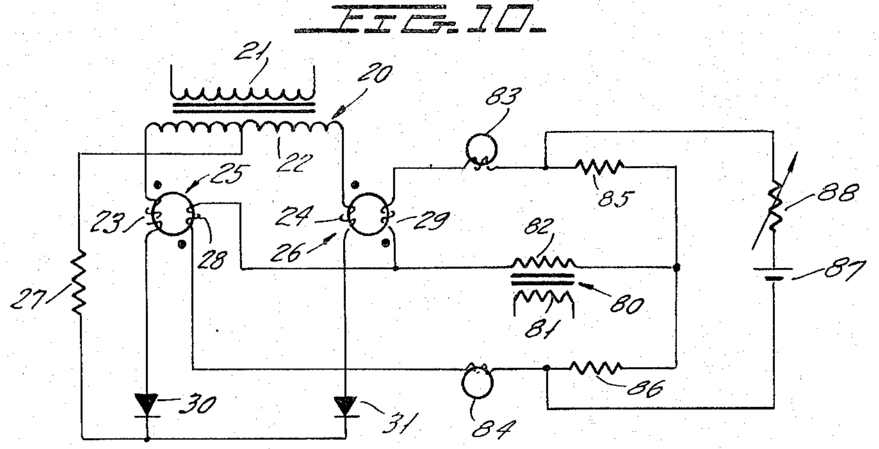

FIGURE 10 shows a second embodiment of the auxiliary volt-second source for the circuit of FIGURES 1 and 5.

Figure 11:
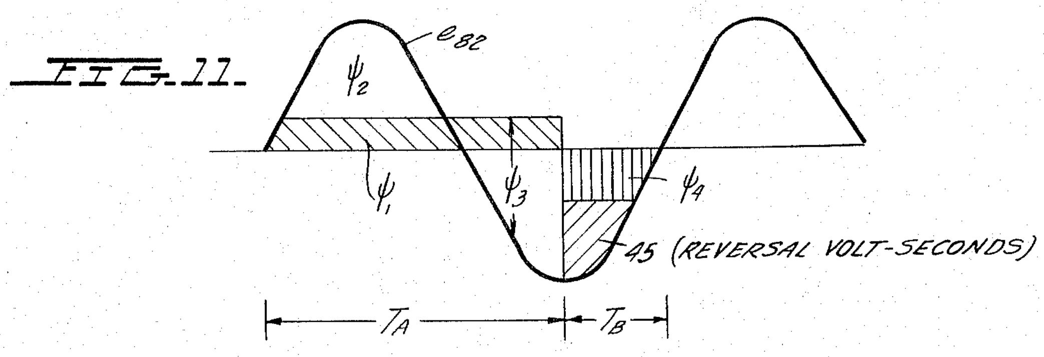

FIGURE 11 illustrates the voltages of the circuit of FIGURE 10.

Figure 12:
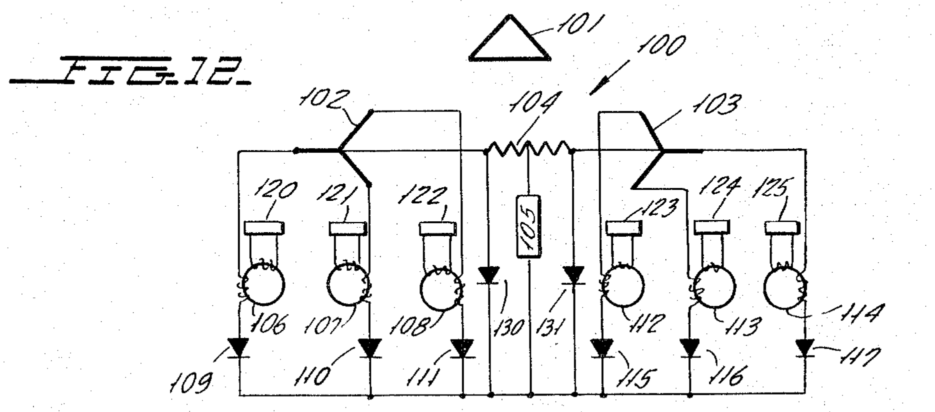

FIGURE 12 shows the novel invention applied to a double-Y rectifier circuit in combination with a free wheeling diode connected across each Y.

Referring first to FIGURE 1, we show a typical magnetic amplifier which includes a transformer 20 having an input winding 21 which is connected to a suitable A.-C. source and a secondary center tapped winding 22. The outer ends of winding 22 are connected in series with diodes A and B which are in turn connected in series with main windings 23 and 24 of saturable reactors 25 and 26 respectively. A load 27 is then connected in the usual manner as shown.

Each of reactors 25 and 26 are then provided with control windings 28 and 29 respectively which have polarities as schematically shown by the black dots. An adjustable source of D.-C. current is then connected in series with windings 28 and 29 as shown schematically so that each of winding carries an adjustable current $i_{bias}$.

Figure 3A:
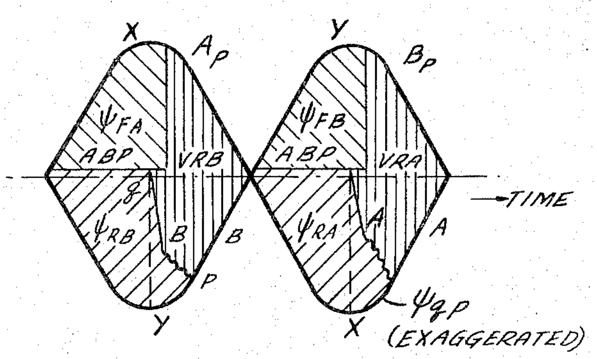

The following description of the operation of the circuit of FIGURE 1 is taken with regard to FIGURES 2, 3*a*, 3*b*, 3*c*, 3*d* and 4 and illustrates problems of such circuits, particularly for non-ideal high current diodes (or banks of diodes). The voltages $x$ and $y$ of FIGURE 3*a* represent the voltages appearing at ends $x$ and $y$ respectively of winding 22 with regard to the center O of the winding.

Figure 2:
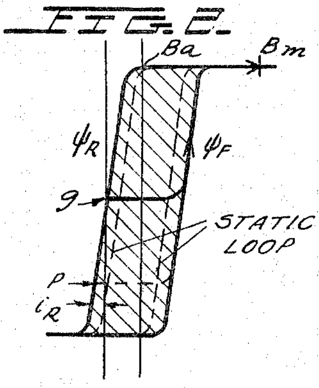
FIGURE 2 shows the magnetizing curve of one of the reactors of FIGURE 1.
Figure 3B:
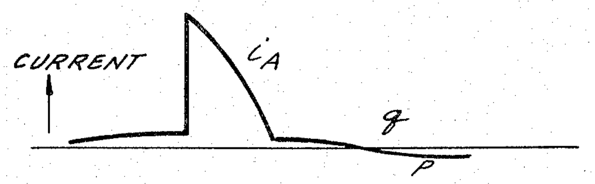
Figure 3C:
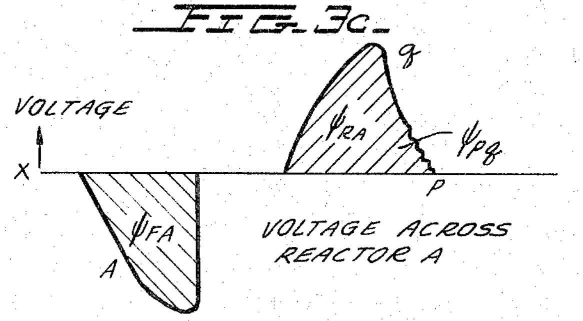
Figure 3D:
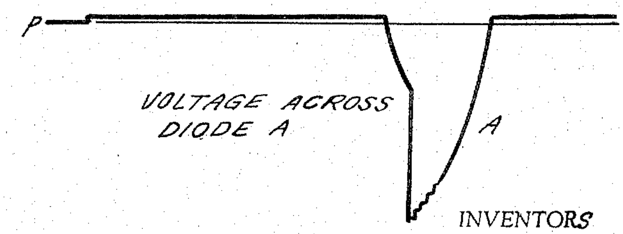

FIGURE 2 shows the hysteresis loop of the reactor iron, the effect of bias and the effect of diode leakage current. Disregarding the effect of variation of leakage current and the change in the hysteresis loop produced by the speed of magnetization, the reduction or reversal of the flux would stop at the intersection, $q$, of the bias line and the reverse slope of the loop. However, if the leakage ampere turns is appreciable and the intersection is quite flat, i.e., acute reversal, flux will continue down to the point, $p$, which means that the reverse voltage during this interval is divided between the reactor and the diodes. This voltage division is shown in FIGURES 3*a*, 3*c* and 3*d*.

The values $\psi$FA and $\psi$FB represent the volt-seconds ($\int edt$) applied to reactors 25 and 26 respectively during the blocking period prior to power on current conduction while the values $\psi$RA and $\psi$RB represent the volt-seconds applied to reactors 25 and 26 respectively during reverse voltage conditions on their respective diodes.

FIGURE 4 illustrates the leakage current of one of the diodes of FIGURE 1, which is relatively constant over a considerable portion of the reverse voltage, but then begins to build up at higher levels of voltage. Superimposed on this is the magnetization curve of one of the reactors of FIGURE 1 during the flux reversing cycle, constructed by applying the reversing characteristic of FIGURE 2 to the volt-second integral of the sinusoidal reverse voltage.

Starting at point $q$, the magnetizing current requirement of the reactor is smaller than the reverse leakage current of the diode and therefore there is a voltage division between the two until the two curves intersect at point $p$. At this point the voltages across the reactor and diode are equal. Beyond this point, most of the available voltage will appear across the diode. The reactor will then slip down to the narrower static loop. It is easy to see that a slight variation in either of the two curves can make them coincide beyond point $p$, or there may be several intersections beyond $p$. The exact form and extent of the voltage division is therefore quite unpredictable and on an oscillograph it is seen as an irregular, ragged line. The full voltage finally appears across the diode when the reverse current through the diode is no longer sufficient to change the flux density in the reactor core.

The flat intersection of the bias line and the magnetizing curve in FIGURE 2 as well as the changes produced by speed of magnetization in the magnetizing curve, emphasize the fact that matching of ampere turns in the windings of the saturable reactors does not lend itself to accurate control of the quantity of flux reversal. It therefore does not provide accurate control of the volt-seconds to be absorbed in the succeeding blocking cycle; and therefore, does not provide accurate control of the gated voltage and current imposed on the load circuit during the remainder of the forward voltage cycle.

Referring now to FIGURE 5, we have illustrated the novel invention for the circuit of FIGURE 1 wherein diodes A and B of FIGURE 1 are identified as numerals 30 and 31 respectively. In accordance with the invention, the D.-C. bias of FIGURE 1 is replaced by an auxiliary source of volt-seconds (rather than ampere turns) which includes auxiliary transformer 32 having windings 33 and 34 in a manner similar to transformer 20. The right hand side of winding 34 is connected in series with winding 29, diode 36 and load 37.

As shown in FIGURE 5, windings 22 and 34 are so connected that voltages $e_1$ and $e_3$ are in phase and voltages $e_2$ and $e_4$ are in phase but diodes 35 and 36 are connected in opposite series to diodes 30 and 31. Therefore, diodes 35 and 36 conduct while diodes 30 and 31 are in their blocking direction. Taking reactor 25 by way of example, as soon as the current through diode 30 decreases to zero, the diode 35 will begin to conduct so that the voltage $e_3$ is applied to winding 28. This will then cause flux reversal as shown in FIGURE 7 of an amount $\int edt=\Delta\psi$ to bring the flux of the core of reactor 25 to point $x$. As the voltage $e_1$ now becomes positive, current conduction through diode 30 is regarding until the flux is again reversed (reset) by the amount $\Delta\psi$, thus achieving the desired control. Note that resistor 37 is adjustable so that the value $\int edt$ applied to the reactor can be suitably adjusted for control of the output applied to load 27. Control can also be obtained by varying the magnitude or phase angle of voltages $e_3$ and $e_4$.

It will be noted that this novel mode of control is independent of the speed om magnetization, slope of the hysteresis loop, and diode leakage current as contrasted to the D.-C. bias type control.

FIGURE 8 illustrates the manner in which the novel mode of operation may be applied to a multiphase bridge connected magnetic amplifier wherein the delta connected winding 50 of a power transformer is connected to the bridge arms which contain diodes or suitable diode banks 51 through 56 which are in series with control reactors 57 through 62 respectively. The novel auxiliary source of volt-seconds then includes a similar multiphase secondary winding 63 which is connected in bridge relation with diodes 64 through 69. The load for the main magnetic amplifier is then shown as load 70 while the load for the auxiliary source is shown as adjustable resistor 71. Each of diodes 64 through 69 are then connected in series with the control winding of reactors 57 through 62 respectively with diodes 64 through 69 conducting while diodes 51 through 56 respectively are blocking.

In operation, and as shown in FIGURE 9, the voltage $e_{oa}$ (shown in FIGURE 8 as the voltage from the transformer neutral point $a$) may be suitably phased so that, while diode 51 is blocking, the voltage $e_{oa}'$ is applied to the control winding of reactor 57 to reverse its flux by an amount $\int edt$ which would be adjusted by load 71 or in any other suitable manner. Clearly, each of the other arms act in the same way.

FIGURES 10 and 11 illustrate the manner in which the auxiliary source for supplying volt-seconds can be of the pulse type in the fashion of the circuit shown in the above noted Patent 2,817,805 to Diebold for the circuit of FIGURE 5. Thus, the auxiliary source of volt-seconds connected to windings 28 and 29 includes a transformer 80 whose primary winding 81 is connected to a suitable A.-C. source. The secondary winding 82 then drives the two series circuits including auxiliary saturable reactors 83 and 84 respectively and resistors 85 and 86 respectively. A D.-C. bias source 87 in series with adjustable resistor 88 is then connected as shown. The windings 28 and 29 are reversed in polarity with respect to that used in a mechanical rectifier, so that the flux is reversed by a fixed amount from forward saturation, instead of reset in the forward direction.

Thus, referring to FIGURE 11, the voltage $e_{82}$ which is the voltage of winding 82 has a phase relation to the voltage of winding 22 such that flux reversal of reactors 25 and 26 is accomplished in a relatively short time during the reverse voltage periods of diodes 30 or 31 respectively. More specifically, winding 82 will deliver pulse currents alternately into the circuits including windings 28 and 29 according to the D.-C. bias current delivered by source 87 and to the resistance of the values of resistors 85 and 86. Considering the flux reversal operation of reactor 25, during the conduction of diode 30, the volt-second area $\psi_2$ is absorbed by reactor 84 which is sufficiently large to prevent saturation. When the voltage $e_{82}$ reverses, however, the volt-seconds $\psi_3$ applied to core 84 is in the direction of previous saturation whereby core 84 saturates at the end of time $T_A$. After time $T_A$, the current flow through winding 28 is limited only by the magnetizing current of winding 28, which current causes a volt-second area $\psi_4$ loss across the control circuit resistances. The remaining volt-seconds $\psi_5$ from source 82 is then available for flux reversal of reactor 25 during the interval $T_B$. Clearly, this amount of volt-seconds can be adjusted by adjustment of resistor 88. It is to be clearly understood that the reversal volt-seconds drives the flux of reactors 25 and 26 in a direction opposite to the direction of flux change caused by forward current flow through their respective diodes 30 and 31 respectively.

As pointed out previously, the invention has particular application to multiphase single way connected systems where the parallel operation of elements can cause severe instability. A typical circuit is shown in FIGURE 12 as a double Y rectifier. Thus, a main power transformer 100 has a delta connected primary winding 101 and two secondary Y connected winding 102 and 103. The neutrals of windings 102 and 103 are connected through interphase transformer 104 to a load 105.

Secondary winding 102 is then provided with control reactors 106, 107 and 108 and respective diodes (or banks) 109, 110 and 111 respectively in its respective phases. Similarly, secondary winding 103 is provided with control reactors 112, 113 and 114 respectively. Clearly, these auxiliary sources could take any desired form such as that of FIGURE 10. In operation, and since direct D.-C. biasing is avoided, the errors of the system are not of a cumulative nature so that stability of operation is achieved.

It has been further found, particularly where high inductive leads are driven, that the further use of free wheeling diodes 130 and 131 for each respective Y further improves stability. This is different than the common use of free-wheeling diodes connected directly across the load.

Although we have described preferred embodiments of our novel invention, many variations and modifications will now be apparent to those skilled in the art, and we prefer therefore to be limited not by the specific disclosure herein but only by the appended claims.

The embodiments of the invention in which an exclusive privilege or property is claimed are defined as follows:

1. In a magnetic amplifier having an input circuit, an output circuit, a control reactor and a diode; said control reactor having a magnetic core; said magnetic core having a main winding and a control winding wound thereon; said input circuit, said main winding, said diodes, and said output circuit being connected in series; a control circuit connected to said control winding for supplying a given number of volt seconds to said control winding during the time said diode blocks current flow between said input circuit and said output circuit; said given number of volt seconds being unchanged by the characteristics of said control reactor and said diode; said control circuit including an auxiliary A.-C. voltage source and an adjustable impedance means connected in closed series relation with said control winding; said given voltage of said auxiliary source being in a direction to drive the flux of said core to a given value less than saturation, and in a direction opposite to the direction of flux change caused by forward conduction current through said diode and said main winding; said flux of said reactor core being changed from said given value to a saturated condition when current flows through said diode in the conduction direction of said diode.

2. The magnetic amplifier of claim 1 which further includes at least one additional control reactor and diode connected in series with one another and in series with said input and output circuit; said additional control reactor being constructed in a manner identical to said control reactor; said auxiliary voltage source being further connected to the control winding of said additional reactor for directly reducing, or reversing the flux thereof after current conduction through said additional diode ceased.

3. The magnetic amplifier of claim 1 wherein said auxiliary voltage source includes circuit elements for controllably adjusting the voltage-time area applied to said control winding.

4. A multiphase single way magnetic amplifier; said multiphase single way magnetic amplifier being connected between an A.-C. system and a D.-C. system; a plurality of control reactors and diodes; each of said control reactors having a respective main winding and control winding; each of the phases of said multiphase single way magnetic amplifier including the series connection of a respective control reactor main winding and diode of said plurality of control reactors and diodes; and control circuit means connected to each of said control windings of said control reactors; said control circuit means including circuit means for supplying a predetermined voltage-time area to each of said control windings when the respective diode of said control reactor blocks current flow therethrough; said voltage-time area having a direction for controllably driving the flux of said core of each said respective control reactors to a value less than or in a direction opposite to the direction in which flux is driven by current conduction in the forward direction of the respective diode of each of said control reactors; said flux of said cores being thereafter changed from said value to a saturated condition when each of said respective diodes next conduct forward current; said control circuit means including an auxiliary A.-C. voltage source and adjustable impedance means connected in closed series relation with respect to each of said control windings.

5. The magnetic amplifier of claim 4; said multiphase single-way magnetic amplifier including a first and second multiphase system and an interphase transformer connected between said first and second multiphase systems.

6. The magnetic amplifier of claim 5 which further includes a first and second free wheeling diode; said first and second free wheeling diodes being connected in parallel with said first and second multiphase systems respectively.

References Cited by the Examiner

UNITED STATES PATENTS

| | | | |
|---|---|---|---|
| 2,979,614 | 4/1961 | Woodworth | 330—8 X |
| 3,131,360 | 4/1964 | Lundahl | 330—8 |
| 3,213,203 | 10/1965 | Geyger | 330—8 X |

ROY LAKE, *Primary Examiner.*

N. KAUFMAN, *Assistant Examiner.*